United States Patent
Narisawa et al.

(10) Patent No.: US 6,851,106 B1
(45) Date of Patent: Feb. 1, 2005

(54) OBJECT ORIENTED OPTIMIZING CODE GENERATOR WITH USER SELECTION OF USE OR DO NOT USE FOR DYNAMIC GENERATION OF FUNCTIONS

(75) Inventors: Fumio Narisawa, Hitachi (JP); Hidemitsu Naya, Hitachi (JP); Takanori Yokoyama, Hitachi (JP); Keiichiro Ohkawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/253,944

(22) Filed: Feb. 22, 1999

(30) Foreign Application Priority Data

Feb. 20, 1998 (JP) .......................................... 10-038329

(51) Int. Cl.$^7$ ................................................. G06F 9/44
(52) U.S. Cl. ...................................... 717/108; 717/116
(58) Field of Search ................................ 717/108, 116, 717/9, 151

(56) References Cited

U.S. PATENT DOCUMENTS

| | | | | |
|---|---|---|---|---|
| 5,481,708 A | * | 1/1996 | Kukol ........................ | 717/151 |
| 5,488,727 A | * | 1/1996 | Agrawal et al. ............ | 717/154 |
| 5,493,680 A | * | 2/1996 | Danforth .................... | 717/108 |
| 5,535,391 A | * | 7/1996 | Hejlsberg et al. ........... | 717/151 |
| 5,937,189 A | * | 8/1999 | Branson et al. ............. | 717/101 |
| 6,041,179 A | * | 3/2000 | Bacon et al. ............... | 717/116 |
| 6,101,326 A | * | 8/2000 | Mattson, Jr. ................ | 717/151 |
| 6,129,460 A | * | 10/2000 | Baisley ........................ | 717/151 |
| 6,173,444 B1 | * | 1/2001 | Archambault ............... | 717/159 |
| 6,202,204 B1 | * | 3/2001 | Wu et al. .................... | 717/151 |
| 6,230,314 B1 | * | 5/2001 | Sweeney et al. .............. | 717/5 |
| 6,513,152 B1 | * | 1/2003 | Branson et al. ............ | 717/100 |
| 6,581,203 B1 | * | 6/2003 | Nguyen et al. ............. | 717/106 |

FOREIGN PATENT DOCUMENTS

| | | |
|---|---|---|
| JP | 06266562 A | 9/1994 |
| JP | 07119537 A | 5/1995 |
| JP | 07122158 A | 5/1995 |
| JP | 07241319 A | 9/1995 |
| JP | 07266794 A | 10/1995 |
| JP | 09198485 A | 7/1997 |
| JP | 10038329 A | 2/1998 |

OTHER PUBLICATIONS

Software Reuse Architecture, Process and Organization for Business Success, Ivar Jacobson et al, Jan. 1997, pp. 158–168.*

Template Software Inc. User's Guide to the Snap Development Environment, Chapters 1–3, 1995.*

"Unreachable Procedures in Object–Oriented Programming", Amitash Srivastava, ACM Letters on Programming Languages, vol. 1, No 4, Dec. 1992, pp. 355–364.*

(List continued on next page.)

*Primary Examiner*—Todd Ingberg
(74) *Attorney, Agent, or Firm*—Crowell & Moring LLP

(57) ABSTRACT

A code generation system is provided which optimizes a code generation for a control system applicable to an embedded control system without the need to increase its memory capacity. A total control unit 110 causes to read a model diagram and an operation diagram which depict a software specification stored in a memory 104, and starts specification analysis unit 106 to execute lexical and grammatical analyses thereof. Then, object-oriented function removing unit 107 is started to determine any function which is not used according to a function select item stored in the memory 104. Then, code generation unit 108 is started to generate a code on the basis of the result of the lexical and grammatical analyses of the software specification, and of an output code pattern determined by the object-oriented function removing unit 107.

9 Claims, 13 Drawing Sheets

OTHER PUBLICATIONS

"Algorithm Analysis of the Impact of Changes to Object-Oriented Software", Li Li et al, IEEE, 1996, pp. 171–184.*

"Forcing Behavoral Subtyping through Specification Inheritence", Krishna K. dhara et al, IEEE 1996 pp. 258–267.*

"The Usability Component of a Framework for the Evaluation of OO CASE Tools", Chris Philips et al.*

"Graphical Rewrite Rule Analogies: Avoiding the Inherit or Copy & Paste Reuse Dilema", Corrina Perrone et al, 1998.*

"Inheritance Tree Shapes and Reuse", Byung–Kyoo Kang et al, IEEE, 1997 pp. 34–42.*

"A C++ Data Model Supporting Reachability Analysis and Dead Code Detection", Yin–Farn Chen et al, IEEE 1998.*

"Inheritance Gragh Assessment Using Metrics", Jean Mayand et al, IEEE 1996, Proceedings of Metrics '96, p. 54–63.*

"Object–Oriented Refactoring Process Design for the Software Reuse", IEEE Jong–Ho Lee et al pp. 221–226, Feb. 2001.*

"Precise Call Graph Construction for OO Programs in the Presence of Virtual Functions", IEEE, pp. 412–416, D. Bairagi et al., 1997.*

"Object–Oriented Compiler Construction", Chapter 12 Optimization, Jim Holmes Nov. 29, 1994.*

Japanese Patent Office web page, "www.ipdl.jpo.go.jp/homepg_e.ipdl", pp. 1–4 of printout.*

*A Code Generator with Application–Oriented Size Optimization for Object–Oriented Embedded Control Software*, Fumio Narasawa et al; ISBN: 3–540–65460–7; Springer–Ferlag Publishing Company; LNCS (Lecture Notes in Computer Science) 1543; Orject–Oriented Technology: ECOOP '98 Workshop Reader ppp 507–510.

* cited by examiner

| SENSOR | | |
|---|---|---|
| A/D_VALUE | unsingned char | 301 / 302 |
| VALUE | signed short | |
| PREV_VALUE | signed short | |
| CHECK() | boolean : void | 303 |
| UPDATE () | void : void | |

FIG. 5

| | FUNCTION ITEM SELECTION | |
|---|---|---|
| 501 | INPUT PATTERN | OBJNAME METHODNAME (ARG) |
| 502 | FUNC. ITEM TO USE | DYNAMIC GENER. OF INSTANCES |
| 503 | SET-UP OPTION | "TO USE" / "NOT TO USE" |
| 504 | OUTPUT CODE | TO USE DYNAM. GEN. OF INSTANCE<br><br>OBJNAME. METHOD NAME (ARG)<br><br><br>NOT TO USE DYNAM. GEN. OF INSTANCE<br><br>OBJNAME_METHNAME (ARG) |

```
push1 $20
call SENSOR_CHECK
addl  $4.%esp
movl %eax.%eax
testl %eax.%eax
je .L2
```
(a) DYNAMIC GEN.
    NOT USED

```
push1 $20
leal -88(%edp.%eax)
push1 %eax
call DEt._3SENSOR_CHECK
addl  $8.%esp
movl %eax.%eax
testl %eax.%eax
je .L238
```
1001
(b) DYNAMIC GEN.
    USED

FIG. 9

```
if(SENSOR_CHECK{
    SENSOR_UPDATE():
  }else{
  VALUE=PREV_VALUE):  }

SENSOR_CHECK(void){
    :
    :
}

SENSOR_UPDATE(void){
    :
    :
}
```

(a) DYNAMIC GEN. FUNCTION
NOT USED. (C LANGUAGE)

```
if(SENSOR・CHECK()){
    SENSOR_UPDATE():
  }else{
  VALUE=PRE_VALUE):  } class SENSOR{
public:
  bool CHECK():
  void UPDATE():

SENSOR::CHECK(void){
    :
    :
}

SENSOR::UPDATE(void){
    :
    :
}
```

(a) DYNAMIC GEN. FUNCTION
USED. (C++LANGUAGE)

FIG. 11
(a) VIRTUAL FUNCT. USED
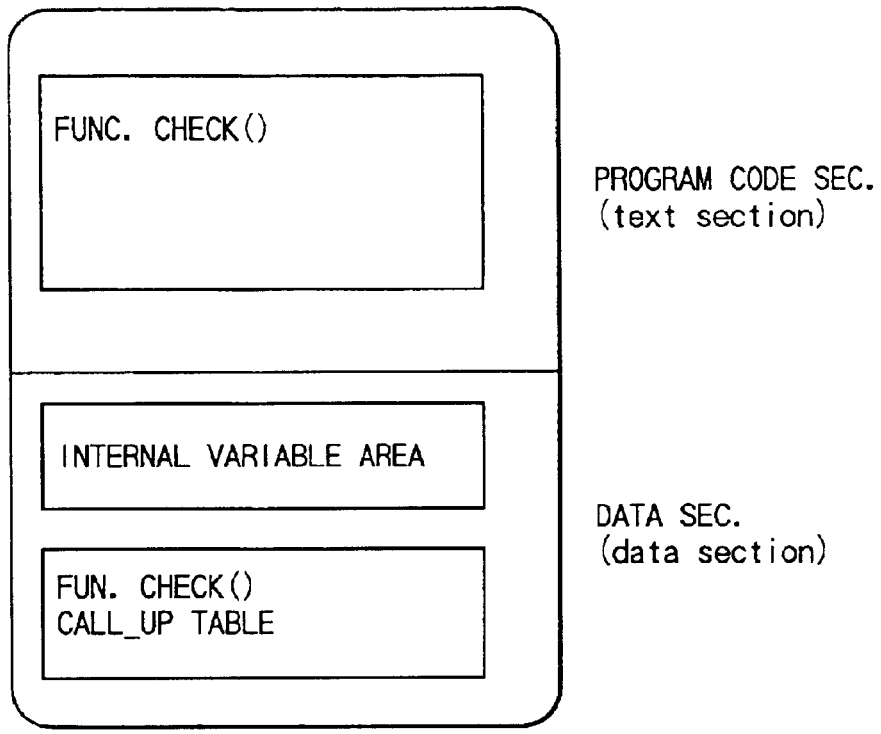
(a) VIRTUAL FUNC. NOT USED
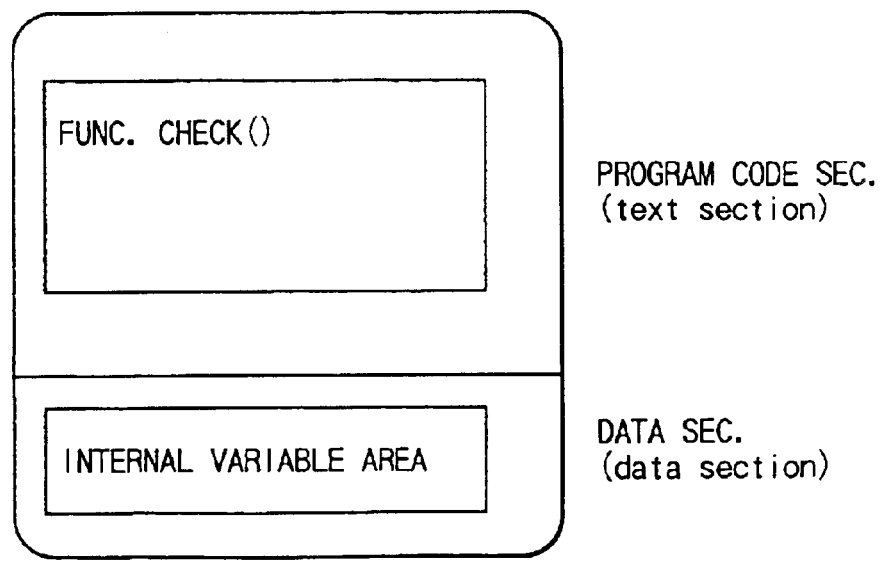

| FUNCTION | SET - UP |
|---|---|
| VIRTUAL FUNC. | NON USE |
| DYN. GEN. OF INSTANCE | USE |
| ⋮ | ⋮ |

FIG. 17

(a) ANALYSIS RESULT DISPLAY UNIT

CLASS B

NOs. OF INSTANCES

PARENT CLASS
  CHILDEN CLASS

INHERIT. METHOD USED

A::Meth 1()
    A::Meth 3()

METHOD NOT USED

B::Meth 5()

(b) USED FUNC. DESING. UNIT

| OPTIMIZATION RULE | |
|---|---|
| FUNCTION | SET - UP |
| DYNAM. IMPLEM. | ○ USE   ● NON USE |
| INHERITANCE | ○ USE   ● NON USE |
| ⋮ | ⋮ |
| ROUTINE PROCESS NAME | Get() <br> Set() <br> ChkStatus() |
| ⋮ | ⋮ |

OBJECT ORIENTED OPTIMIZING CODE GENERATOR WITH USER SELECTION OF USE OR DO NOT USE FOR DYNAMIC GENERATION OF FUNCTIONS

BACKGROUND OF THE INVENTION

The present invention relates to an automatic software generating system, and in particular, to a software generating system for automatically generating software from an object-oriented specification which features an improved code efficiency.

A code generating system generates software from an object-oriented software statement. Generally, a specification described by an operator is entered via an input device, then the specification is analyzed, and a program code is generated and output.

However, when a code is generated simply on the basis of the specification described by the operator, there arises such a problem that a target code becomes enormously large, thereby requiring a large memory capacity therefor.

In order to solve this problem associated with the conventional art, JPA Laid-Open No. 6-266562 discloses a method for reducing the size of a target code. This method includes the steps of: comparing a class name to which its method belongs and an input file if they coincide with each other during semantic analysis processing of a class declaration in a context semantic analyzer provided for analyzing the specification written by the operator; generating in an output code an instance and declaration in a method address store table upon matching therebetween; and generating in the output code only the declaration in the method address store table upon non-matching therebetween.

However, the conventional code generation method as described above does not take into account whatsoever anything about an object-oriented function to use for generating an object-oriented program code.

That is, when generating a code from an object-oriented specification, unnecessary codes are also generated for unused functions of the object-oriented functions.

When this conventional code generation method is applied, in particular, to a software for an embedded control system, because a resulting output code becomes enormous, a large sized unit having a large memory capacity capable of implementing the enormous code will be required, thus there is such a problem that the cost of manufacture will increase substantially.

SUMMARY OF THE INVENTION

The present invention is contemplated to solve the problems associated with the prior art, and provide for a code generating system in which its code is optimized to suit for any particular target of application and to be applicable to any embedded control system without need of increasing its memory capacity.

The above-mentioned object of the invention can be accomplished by provision of a code generating system which is comprised of: a specification analyzer means which analyzes an object-oriented specification, for deriving specification information; a function removal means for removing unnecessary functions out of plural object-oriented functions according to a predetermined function removal rule on the basis of the specification information derived from the specification analyzer means, and producing a program information without using the unnecessary functions; and a code generation means for generating a code on the basis of the program information produced by the function removal means.

According to the invention, an unnecessary function in an object-oriented programming language is removed during the generation of a code from an object-oriented specification, thereby eliminating its mechanism itself required for realizing the unnecessary function. As a result, the code which can substantially reduce its memory capacity can be generated.

BRIEF DESCRIPTION OF THE DRAWINGS

Other objects, features and advantages of the invention will be apparent from the following description taken in connection with the accompanying drawing wherein:

FIG. 5 is an example of function select items displayed;

FIGS. 9(*a*) and (*b*) show results of respective code generations;

FIGS. 11(*a*) and (*b*) show respective memory allocations in case a virtual function is executed or not;

FIGS. 17(*a*) and (*b*) show examples of displays, respectively.

PREFERRED EMBODIMENTS

Figure 1:
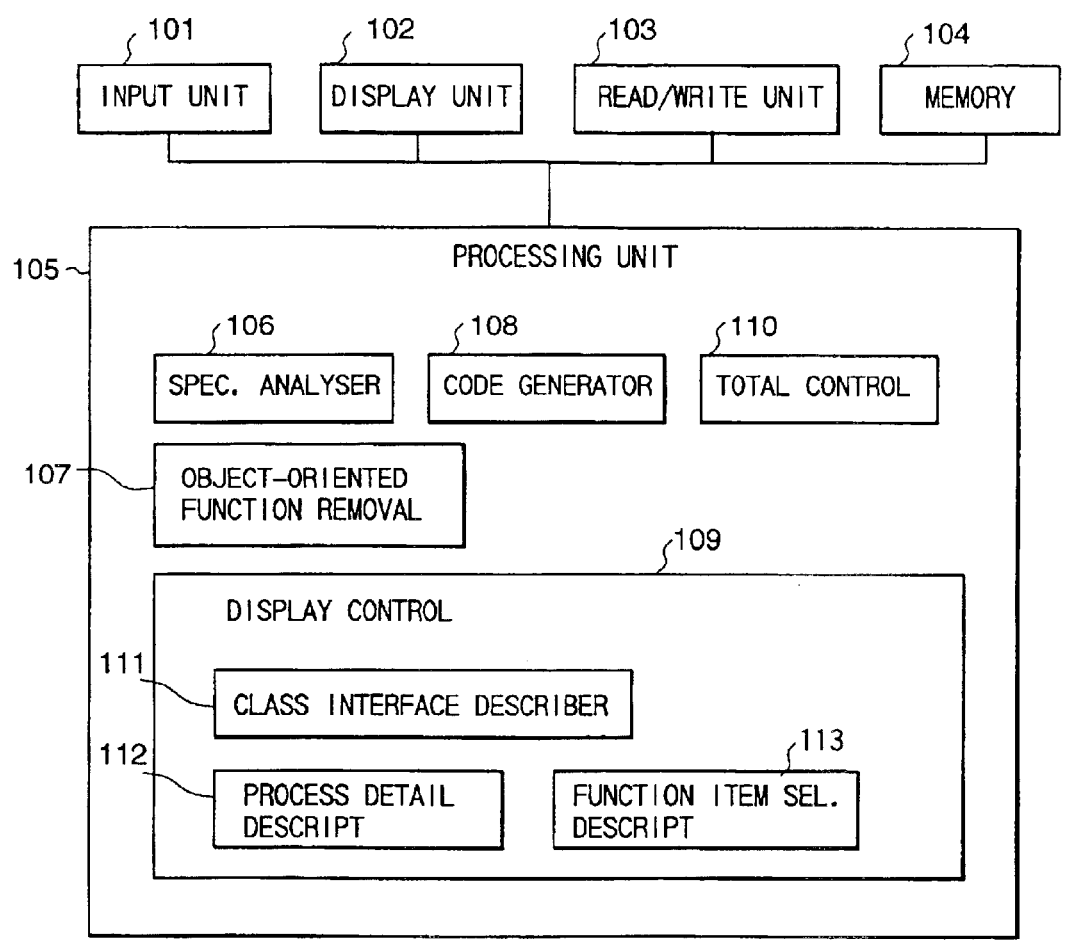
FIG. 1 is a schematic block diagram indicating a code generating system of the invention.

FIG. 1 is a schematic block diagram indicating a configuration of a code generator system of one embodiment of the invention. The code generator system is comprised of: an input device 101 such as a keyboard and a mouse for inputting a software specification and function select items which define conditions for generating an optimized code; a display device 102 such as a CRT for displaying the software specification and the function select items having been input through the keyboard and the like of the input device 101, as well as a code generated; a read/write device 103 for reading a software specification and function select items from a portable memory device such as a floppy disk, and writing the code generated into a memory device; a memory 104 for storing the software specification and the function select items having been entered through the input device 101 or the read/write device 103; and a processor unit 105 for generating an optimized code on the basis of the software specification and the function select items transmitted from the input device 101 and memory device 104.

Further, the processing unit 105 is comprised of: a specification analyzer section 106 for executing lexical and grammatical analyses of the software specification entered; an object-oriented function removal section 107 for removing unnecessary functions on the basis of the function select items entered; a code generator section 108 for generating a code on the basis of the software specification written with the unnecessary functions removed by the object-oriented function removal section 107 and undergone the lexical and grammatical analyses in the specification analysis section 106; an input display control section 109 for controlling the display screen of the display device 102 so as to enable the software specification and function select items to be input from the input device 101; and a total control section 110 for controlling respective sections. Still further, the input display control section 109 includes a class interface description section 111; a process detail description section 112; and a function select item description section 113. In addition, the code which is generated in the code generator section 108 is displayed on the display device 102, and/or stored in a portable memory device such as a floppy disk via the read/write device 103.

Figure 2:
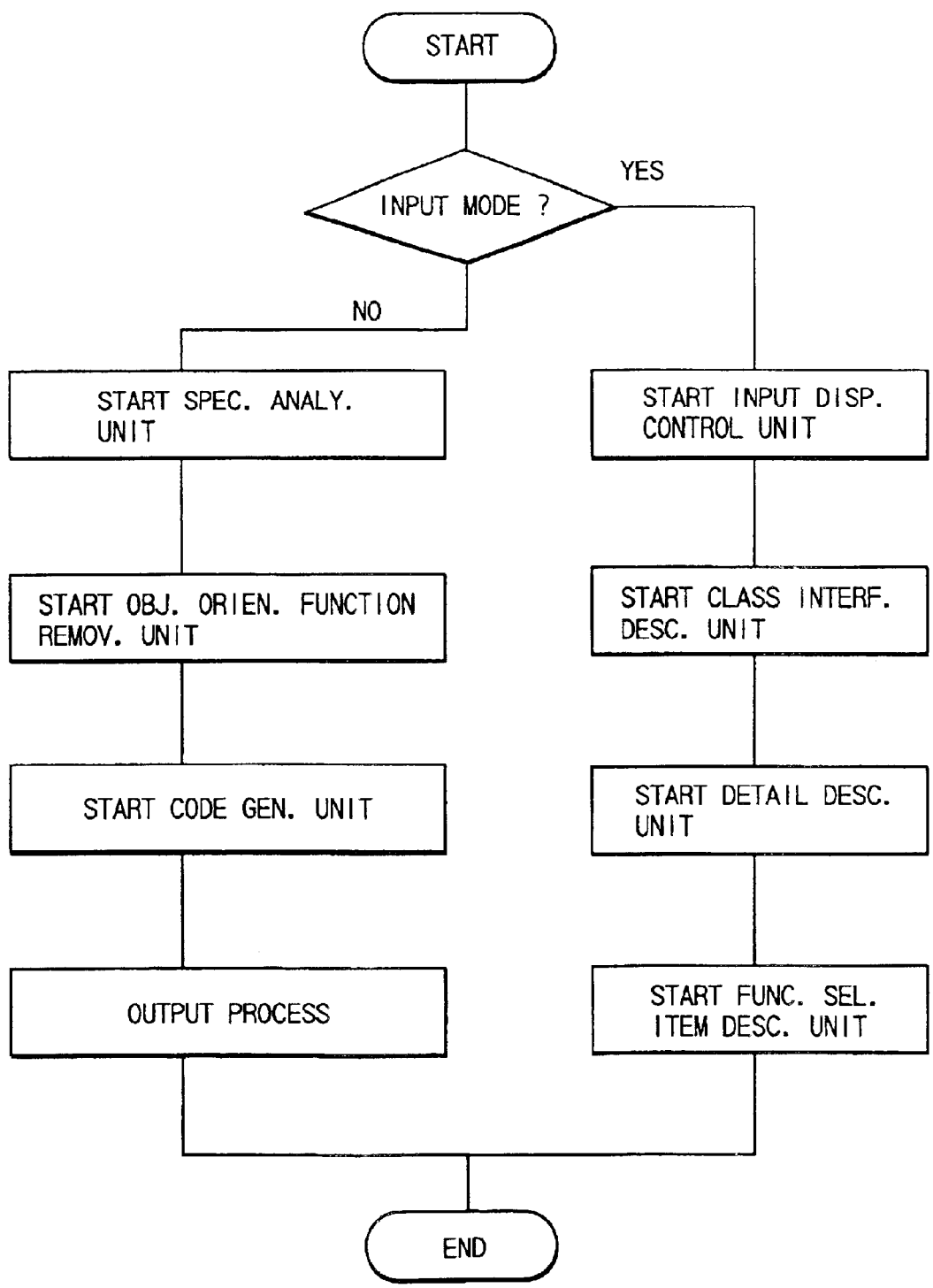
FIG. 2 is a block diagram indicating operation sequences of a total controller in a processing unit of the invention.

With reference to FIG. 2, operation sequences of the total control unit 110 in the processor unit 105 are shown in a flow chart. This processor unit 105 is provided with an input mode for inputting a software specification and function select items for code generation, and a code generation mode for generating a code on the basis of the software specification entered. When the input mode is selected via the input device 101 by the operator, the total control section 110 starts the input display control section 109. Then, the input display control section 109 accepts a model diagram representing a pattern of a software specification entered by the operator via the class interface description section 111, and stores this model diagram in the memory device 104.

Then, the process detail description section 112 within the input display control unit 109 is started to allows for the operator to accept the input of an operational diagram representing the pattern of the software specification, then this operational diagram is stored in the memory device 104.

Finally, the function select item description section 113 is started to allow for entry of a function select item which defines conditions for generating a code on the basis of the software specification entered, and to store the same in the memory device 104.

On the other hand, in case the code generation mode is selected by the operator, the total control section 110 allows to read a model diagram and operational diagram which is the software specification from the memory device 104, then starts the specification analyzer section 106 to execute lexical and grammatical analyses thereof. Then, the object-oriented function removal section 107 is started to determine which function is not needed in accordance with the function select items stored in the memory device 104. Then, the code generator section 108 is started to generate a code on the bases of the software specification subjected to the lexical and grammatical analyses in the specification analyzer section 106, and of an output code pattern determined in the object-oriented function removal section 107. Further, the code generated is displayed on the display device 102 upon request by the operator, and/or written into a floppy disk via the read/write unit 103.

Each processing described above will be set forth in detail using a method referred to as OOIE in the object-oriented analysis and design work in the following.

A case where the input mode is selected by the operator will be described. Upon selection of the input mode, the total control section 110 starts the class interface description section 111. Thereby, the operator is allowed to input a model pattern shown in FIG. 3 as a software specification using the keyboard and mouse of the input device 101. The model pattern in FIG. 3 indicates processing of an input from a sensor which constitutes, for example, a part of an automobile engine control.

Figures 3, 4:
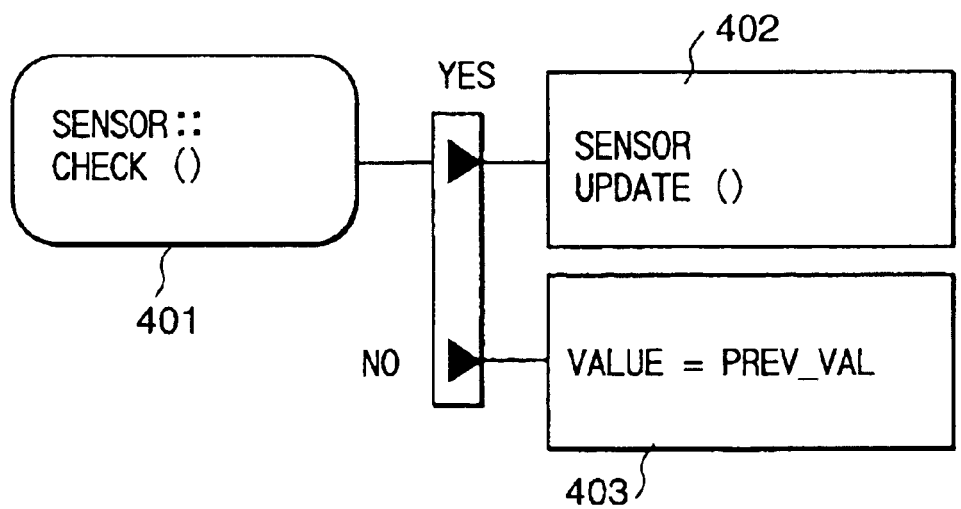
FIG. 3 shows an example of model diagrams and its inputs.
FIG. 4 shows an example of operation diagrams and its inputs.

The model diagram indicated in FIG. 3 depicts a structure of objects each constituting a part of a program in an object-oriented programming. By way of example, the model diagram depicted here is referred to also as a class diagram or object diagram in the field of the object-oriented art.

Static information is described in detail in this model diagram which includes three rows of lines. The first row 301 depicts a name and type of a variable corresponding to a class title, the second row 302 depicts a definition of its data structure, and the third row 303 depicts a title of processing to be executed and a type of argument, respectively.

According to the model diagram of FIG. 3, the title of its class is "Sensor" as indicated in the first row 301. Data of its class as indicated in the second row 302 are "A/D_VALUE", "VALUE" and "PREV_VALUE", wherein the "A/D VALUE" is defined to be a type of "unsigned char", the "VALUE" to be of "signed short", and the "PREV_VALUE" to be of "signed short", respectively. Further, a method which indicates its process to execute is indicated in the third row 303 as "CHECK( )" and "UPDATE( )", wherein the "CHECK( )" has no argument and a type of its return value is "boolean: void", and wherein the "UPDATE( )" has no argument nor a return value. Upon completion of entry of the model diagram described by the operator as stated above, the class interface description section 111 allows the model diagram to be stored in the memory device 104.

Then, the total control section 110 causes the process detail description section 112 to be started to allow for the operator to enter an operational diagram as shown in FIG. 4 using the mouse, keyboard or the like. The operational diagram refers to a detailed description of a method indicating a process of each object belonging to each class. This may be referred to also as a control chart, a state transition diagram or the like other than the operational diagram in the object-oriented field. In FIG. 4, processing of signals from the sensor as indicated in the third row of FIG. 3 is described in detail. In step 401 of "SENSOR CHECK( )", it is determined whether or not an A/D conversion value entered from the sensor satisfies a predetermined condition. If it satisfies (YES), "SENSOR UPDATE ( )" is executed, and if does not (NO), a process of step 403 is executed to hold such that "VALUE=PREV_VAL". The operational diagram entered by the operator is then stored in the memory device 104.

Then, the total control section 110 starts the function select item description section 113 to display the function select input screen on the output device 102. The function select refers to a selection of operation whether to use or not to use an object-oriented function such as "dynamic generation of an instance", "virtual function" and the like during its code generation.

FIG. 5 shows an example of input display screens of the function select items. This input screen shows a case where a function select item of "Dynamic selection of an instance"

is selected by the operator for an object-oriented task. This function select item screen includes four rows of an input pattern 501, a function item to use 502, a set-up option 503, and an output code pattern 504. The input pattern row 501 is for entering an object name and a method name of an object program. The function item to use 502 is a row for indicating the function of the object program. The set-up option 503 is for choosing between "to use"/"not to use" of the function indicated in the use-of-function item 502. The output code pattern 504 corresponds to respective options in the set-up option 503, and indicates respective output code patterns thereof. Namely, a generation pattern information of "OBJNAME, METHODNAME(ARG)" corresponds to "to use" in the set-up option 503, and a generation pattern information of "OBJNAME_METHODNAME(ARG)" corresponds to "not to use" in the set-up option 503, respectively. Further, the "OBJNAME_METHODNAME (ARG)" depicts a part's name, which means that a code is generated without using "Dynamic generation of instance" of the object-oriented programming language.

The use-of-function select item 502 and the output code pattern 504 are entered in advance on this function select item screen. Therefore, the operator can easily choose whether to use or not to use its object-oriented function by entering data through the input pattern 501 and set-up option 503. The function select item determined by the operator is stored in the memory device 104.

In the input mode as described hereinabove, the software specification and the function select item are entered by the operator.

Then, a case where the operator chooses the code generation mode will be described in detail in the following.

Upon selection of the code generation mode by the operator, the total control section 110 starts the specification analyzer unit 106.

Lexical and context analyses are executed in the specification analyzer unit 106, then character strings derived from the software specification information having been entered as diagrammatic information and types of these character strings are output as shown in FIGS. 3 and 4.

Figure 6:
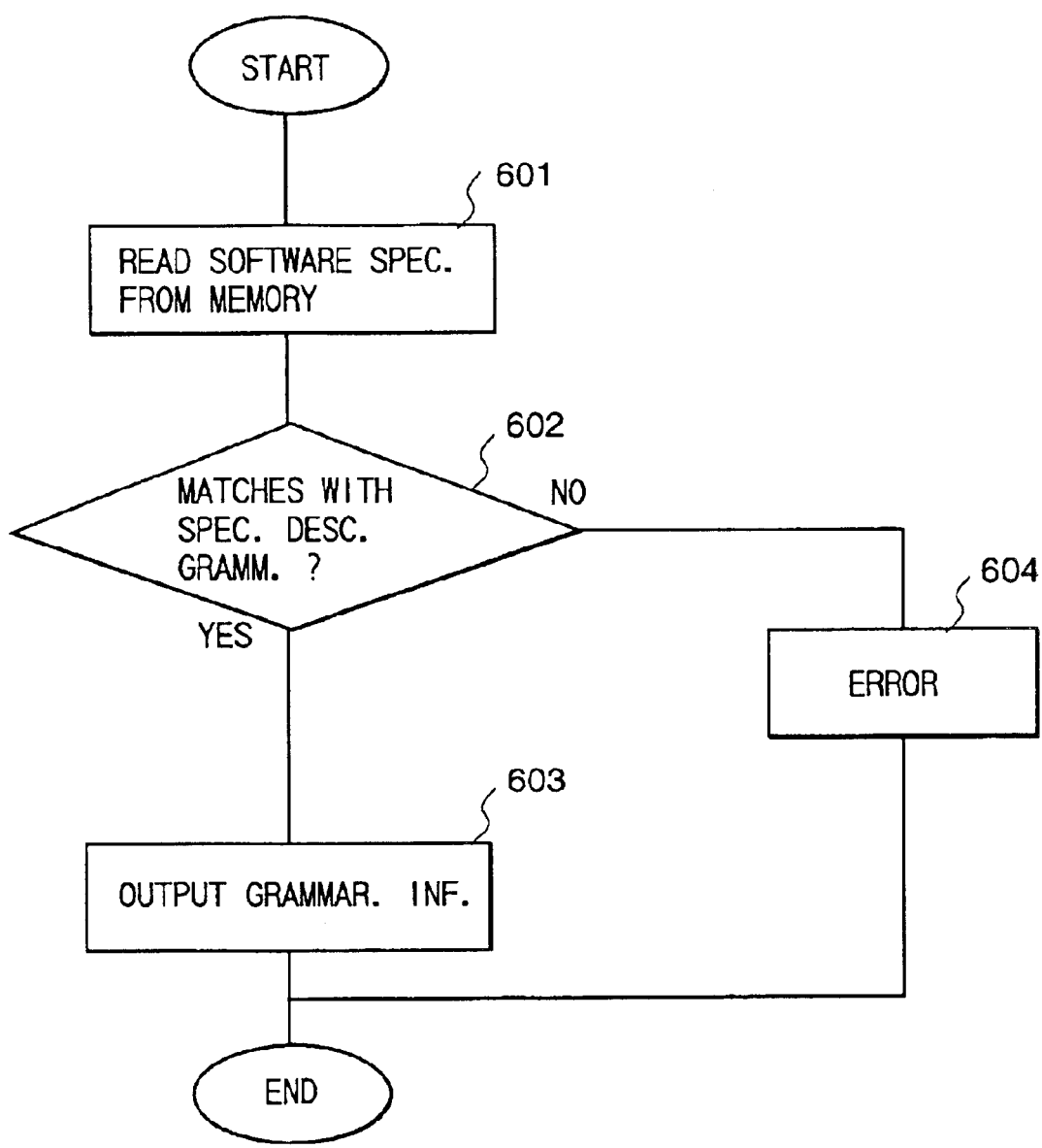
FIG. 6 shows operation sequences in a specification analyzing unit.

FIG. 6 shows a flow chart of processing for the specification analysis section 106 to carry out. In step 601, the specification analysis section 106 reads out the software specification entered by the operator and stored in the memory device 104. In step 602, the software specification information which is entered as the diagrammatic information is checked if it matches with a specification description grammar stored in advance in the memory device 104. As to this matching, "lex" and "yacc" described in the "lex & yacc programming" co-authored by John R. Levine/Tony Mason/ Doug Brown, Jun. 21, 1996 were used to determine whether or not a specification description grammar described in the BNF or the like and the software specification having been entered accord with each other. When it is judged as a result of determination that there exists no matching with the specification description grammar, an "error" is output in step 604 to the display device 102, and the process ends. When it is judged that there exists matching with the specification description grammar, a character string from the software specification entered is output in combination with the name of a variable of this character string as a pair in step 603.

For example, information on the software specification entered by the operator and checked as indicated in FIG. 6 is output sequentially as a character string "sensor", variable name "variable 1", character string "A/D_VALUE", variable name "variable 2", character string "VALUE", and variable name "variable 3".

Further, information on the software specification indicated in a rounded square in FIG. 4 is defined to be a "method call", and those indicated in a square are defined to be a "command" in advance, respectively. Thereby, for example, the rounded square 401 is output with its attribute as "method call", its object name as "sensor", its method name as "CHECK", and with no argument.

Then, the total control unit 110 starts object-oriented function removal section 107.

The object-oriented function removal section 107 outputs a code pattern according to the function select items entered by the operator and stored in the memory device 104.

Figure 7:
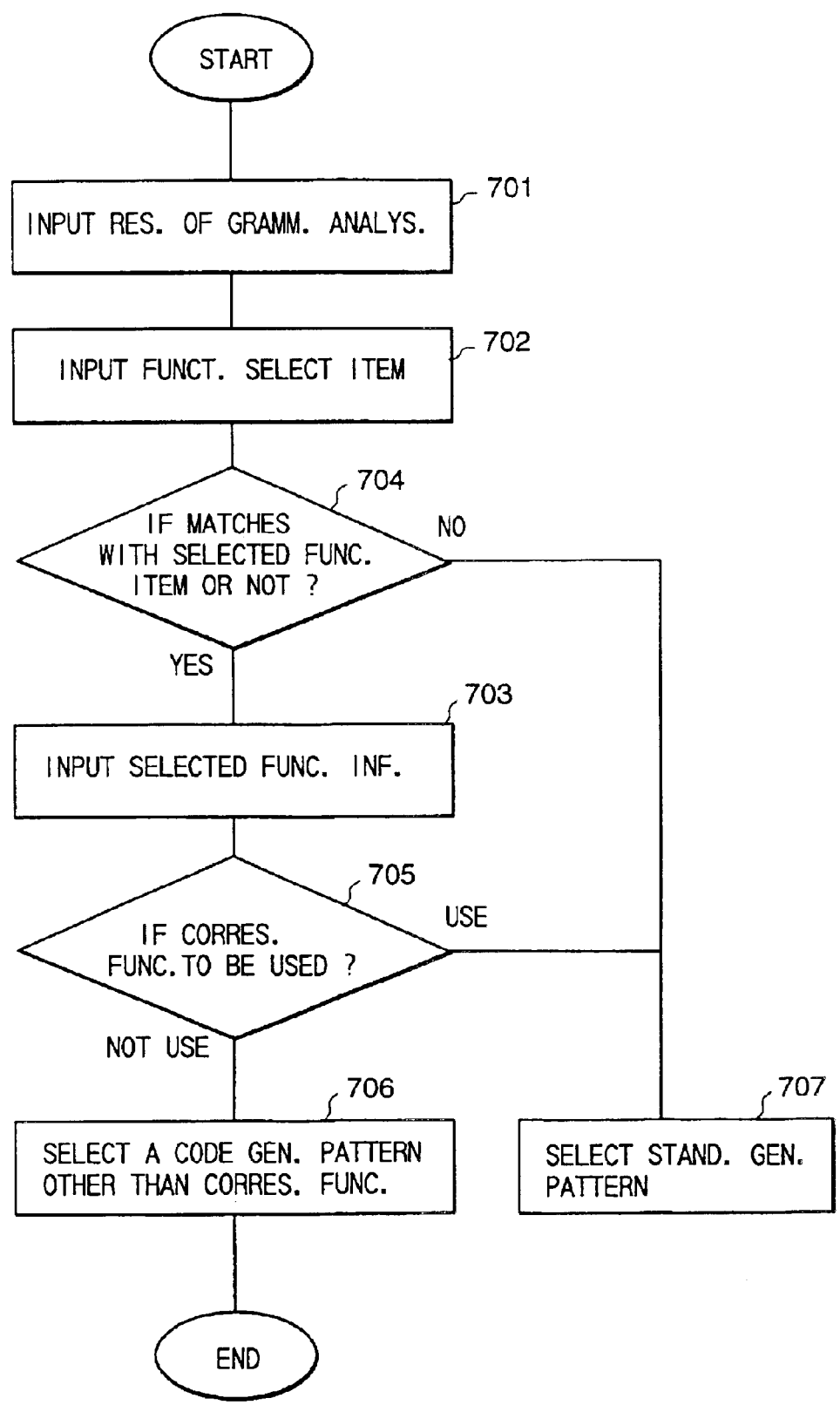
FIG. 7 shows operation sequences in an object-oriented function removal unit.

A flow chart of processing in the object-oriented unction removal section 107 is shown in FIG. 7.

In step 701, a result of grammatical analysis output from the specification analysis section 106 is entered. Then, in step 702, function select items which define a condition under which a code is to be generated are read from the memory device 104 according to the object name, method name derived from the result of the grammatical analysis, and the input pattern of the function select items.

In case a table cannot be read from the memory device 104 in step 702, a standard generation pattern information is output in step 704. In case the table could have been read from the memory device 104 in step 702, it is determined in step 705 whether to use or not to use any particular function according to the function select item having been read. When it is determined to use, a standard generation pattern information defined by the function select item is output in step 707. When judged not to use, a code generation pattern information defined by the function select item is output in step 706.

Then, the total control section 110 starts code generation section 108 to execute code generation.

Figures 8, 10:
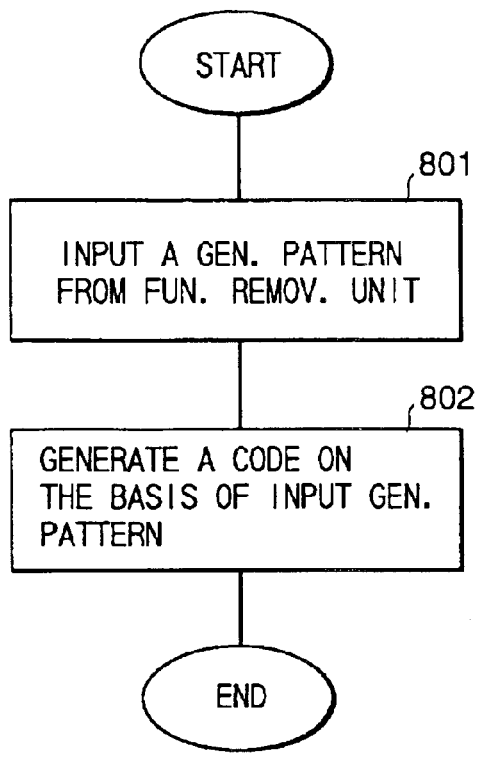
FIG. 8 shows operation sequences in a code generator unit.
FIGS. 10(*a*) and (*b*) show results of respective execution codes generated.

A flow chart indicative of operation of the code generation section 108 is shown in FIG. 8.

In step, 801, the generation pattern information output from the object-oriented function removal unit 107 is entered. Then, in step 802, a code generation is executed on the basis of the aforementioned generation pattern information and the code generation pattern stored and read from the memory device 104.

By way of example, when the software specification from the specification analysis section 106, and the generation pattern information of "OBJENAME, METHODNAME( )" from the object-oriented function removal section 107 as shown in FIGS. 3 and 4 are entered, the code generation section 108 generates a code on the basis of the code generation pattern information from the memory device 104.

Namely, the memory device 104 stores the following information as a code generation pattern.

---

"class" class name "("
type 1, data 1;
type 2, data 2;
.
.
.
return value type 1, method 1(argument type 1);
return value type 2, method 2(argument type 2);
.
.
.
")"
* check sentence
"if ("CHECK") > <"
execution sentence when the condition is satisfied;

-continued

```
"} else {"
    execution sentence when the condition is not satisfied;
"}".
```

When use of "dynamic generation of an instance" is not set up in the table, a code shown in FIG. 9(a) is generated. By compiling this resulting code, an execution code as shown in FIG. 10(a) is obtained. This execution code is output to the display device 102, and/or stored in a floppy disk via the read/write device 103.

By way of example, FIG. 9(b) and FIG. 10(b) show a code generated and its compiled execution code when use of "dynamic generation of an instance" is set up in the table.

In comparison of these two execution codes, when the dynamic generation function is used, an instance is explicitly expressed for an explicit designation of its instance in block 1001 in FIG. 10(b), and a code for storing an address of the instance in stack is generated.

In contrast, when the dynamic generation function is not used, there is no area corresponding to the block 1001 for designating the instance, and no code corresponding thereto is output. By removing the object-oriented function in the manner as described hereinabove, the code size can be reduced substantially.

Another case of using a different function as its object-oriented function will be described by way of example of a "virtual function".

The virtual function sets forth a common interface in a parent class when a plurality of children classes are produced from the parent class using "inheritance", and wherein implementation in each of the plurality of children classes differs from each other. By way of example, the "inheritance" refers to a method of producing a new class by succeeding all the attributes already in existence in some existing class, and describing a difference therebetween.

FIG. 11(a) shows a memory allocation for the code in an execution format, which is generated by the aforementioned method which is set up by choosing the "use of the virtual function" by the operator when the method to use the virtual function is designated. As shown in this drawing, code 1101 for function "FUNC. CHECK( )" is stored in a program code section, and a region 1102 for an internal variable, and a table 1103 for calling a virtual function "FUN. CHEKC( ) CALL_UP TABLE" are stored in a data section. Virtual function table 1101 set forth in the data section realizes a mechanism of the virtual function.

FIG. 11(b) shows a memory allocation of a code compiled in an execution format wherein the function of the virtual function is set "not to use". In this case, because the virtual function is called up directly, a portion corresponding to the table 1103 indicated in FIG. 11(a) is eliminated.

As described above, by removing some of the object-oriented functions such as dynamic generations of instances and/or virtual functions, a corresponding mechanism which becomes unnecessary for realizing its object-oriented function can be removed from its inclusion. For such purpose, no particular knowledge on each object-oriented mechanism is required for the operator to have, thereby simply designating "use/not use" on the display, optimization of the system can be accomplished.

Another method of designating the function select items will be described in the following.

Figures 12, 13:
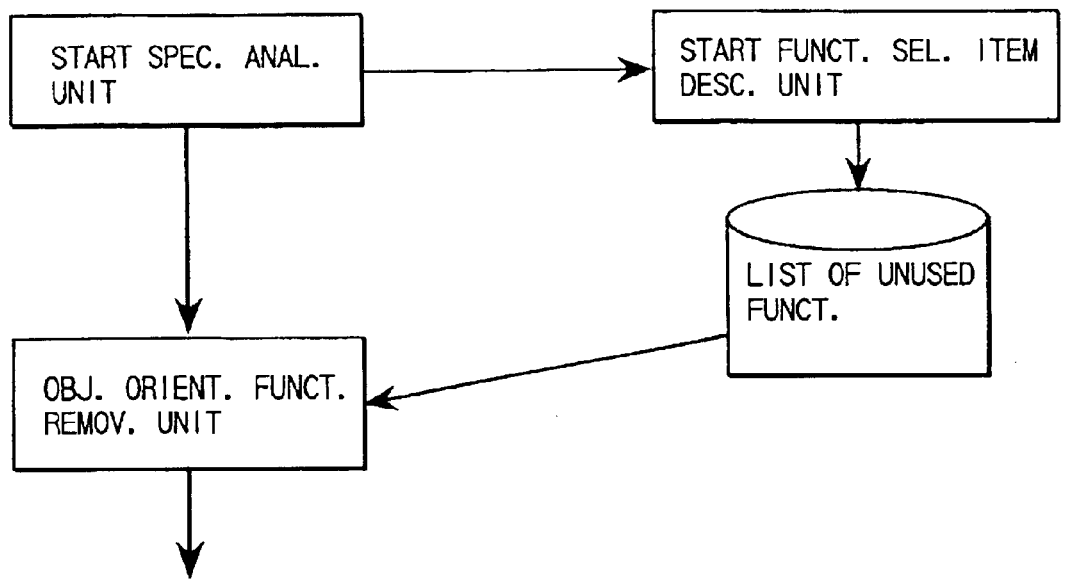
FIG. 12 shows operations of the total controller unit.
FIG. 13 shows an example of the function select items displayed.

FIG. 12 indicates control processing of the total control section 110 with respect to the specification analysis section 106 and the object-oriented function removing section 107 shown in FIG. 1. When an object name and a method name are obtained in the specification analysis section 106, the function select item description unit 113 is started so as to allow entry of a function select item corresponding to the object name and the method name obtained. By provision of such arrangement, there is no need for the operator to enter on the entry pattern of the function select items. Therefore, it is only required to display for the operator such a function select item as shown in FIG. 13.

Figures 14, 15:
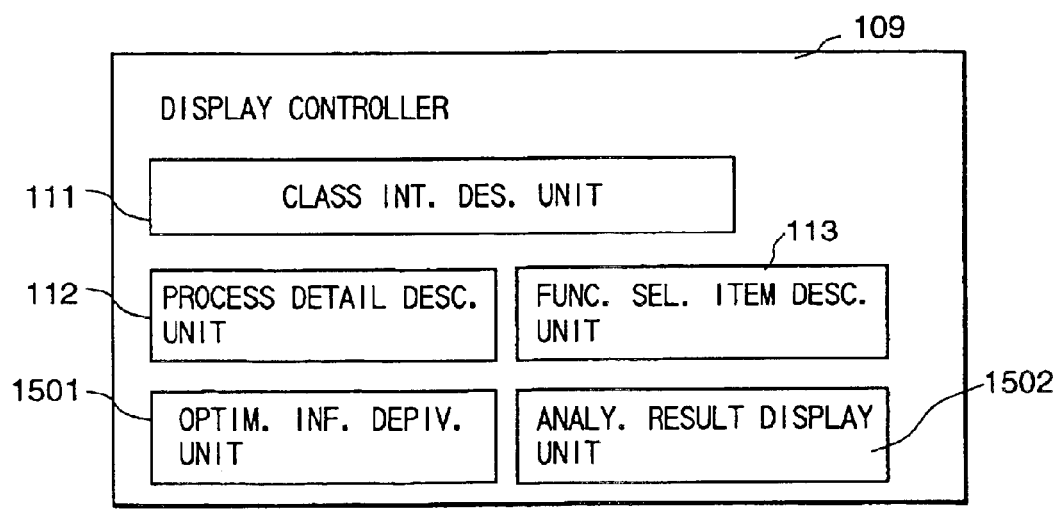
FIG. 14 shows a table of the function select items.
FIG. 15 shows a configuration of an input screen controller.

The function select item shown in FIG. 13 is comprised of a function column and a set-up column, wherein the function column displays a list of object-oriented functions so as to allow for the operator selectively to set up whether or not to use its function corresponding thereto in the set-up column. Then, upon entry by the operator, the function select description unit 113 generates a table as shown in FIG. 14, which is then stored in the memory device 104. Further, code generation patterns corresponding to the "use" and "not use" of each function are prestored in memory device 104.

Then, with reference to a table generated, the object-oriented function removing section 107 reads out a code generation pattern corresponding thereto, and outputs the same to the code generation unit 108 whereby to execute the code generation.

Further example of designating another select item will be described in the following.

FIG. 15 shows a modified arrangement of the input screen control unit 109 of FIG. 1 with addition as new components of an optimization information deriving unit 1501 and an analysis result display unit 1502.

Figure 16:
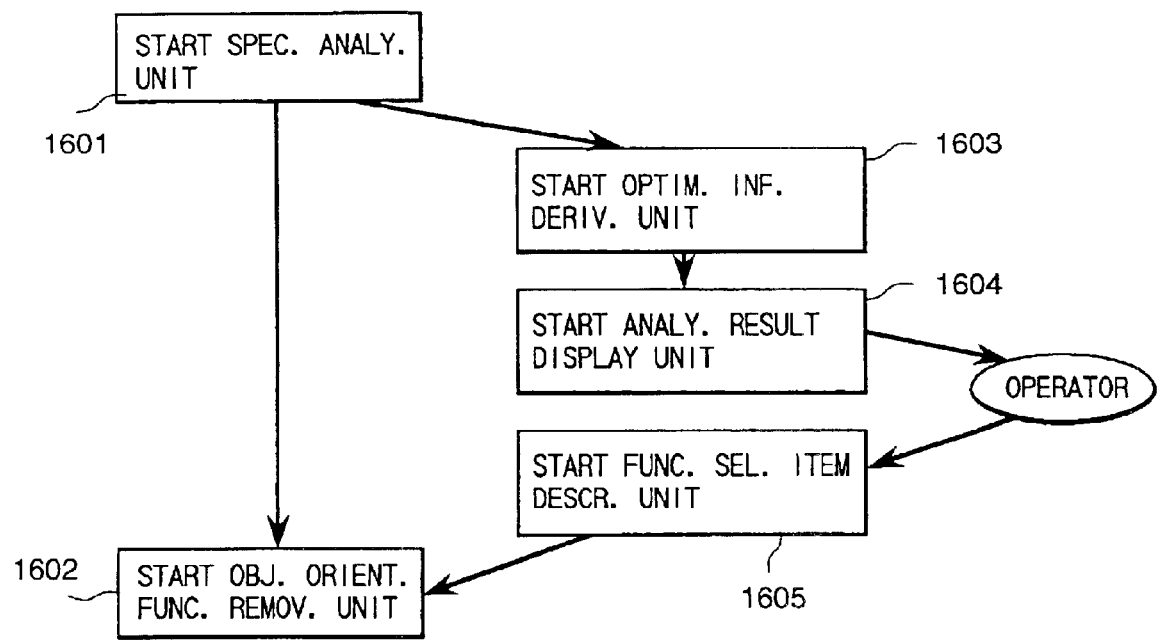
FIG. 16 shows the operation of the total control unit.

FIG. 16 shows a flow of operation of the total control unit 110 with respect to the specification analysis section 106 and the object-oriented function removing section 107 with the arrangement of FIG. 15. As indicated in FIG. 16, information useful for function designation is derived in the optimization information deriving unit 1501 from the information obtained by the specification analysis section 106, and is displayed on the analysis result display unit 1502 to allow for the operator to designate a function to use on the basis of the information displayed through the function select item description unit 113. The optimization information deriving unit 1501 derives optimization information, for example, by counting the number of instances obtained as the result of analysis in the specification analysis section 106, and identifying "use" or "no use" of the virtual functions. This optimization information derived is displayed on the display device 102 via analysis result display section 1502.

FIG. 17(a) shows an example of display on the analysis result display section 1501. Here, the optimization information including the number of instances, the virtual functions selected and the like derived in the optimization information deriving unit 1501 is displayed.

After this optimization information is displayed, the function select item description section 110 displays function select items as indicated in FIG. 17(b) to prompt the operator to enter "use" or "not use" of the corresponding function.

By allowing the operator to utilize the result of analysis obtained in the specification analysis section 106 as described above, a more effective set-up procedure becomes possible in setting up of the items by the user. For example, because the number of instances to be utilized in programming is a major factor in making decision whether to use the dynamic generation of instances or not, such information will help the operator set up more effectively.

Further, this embodiment of the invention is not limited in its applicability to any specific programming language, and can operate in the same way using statements described in C++ or Java.

What is claimed is:

1. A software generation system comprising:

a specification analysis means which analyzes an object-oriented specification input by a system operator, for deriving specification information;

an optimized information input means for inputting optimized information from an external unit, indicating a necessity or lack of necessity for use of a dynamic generation function for dynamic generation of an instance representing one of a set of object oriented functions;

a function removing means which checks said specification information derived by said specification analysis means and the optimized information input via said optimized information inputting means by collating with a predetermined function removal rule, which removes a function which becomes unnecessary from a set of object-oriented functions by which members are realized, for generating from the specification information and the optimized information, program information excluding the unnecessary function; and a code generation means for generating a code according to said program information obtained by said function removing means;

wherein said optimized information input means is operable after said system operator has input said object oriented specification and before generation of said code, and includes a graphic display which presents to said system operator a selection from among use and not-to-use options for said dynamic generation function.

2. The software generation system according to claim 1, further comprising:

an analysis result display means for displaying a status of use of an object-oriented function by which a member is realized from the specification information.

3. The software generation system according to claim 2, wherein said selection means comprises display means for offering to said system operator use and not-to-use options for said dynamic generation function, which options can be selected by said system operator via an input interface.

4. The software generation system according to claim 1, wherein said selection means comprises display means for offering to said system operator use and not-to-use options for said dynamic generation function, which options can be selected by said system operator via an input interface.

5. A software generation system comprising:

a specification analysis means which analyzes an object-oriented specification for deriving specification information;

an optimization instruction input means, which is operable after a program is written, for a system operator inputting an optimization instruction via an external unit, indicating use or not-to-use of respective object oriented functions contained within a set of object oriented functions;

a function removing means which checks said specification information derived by the specification analysis means and said optimization instruction input via the optimization instruction inputting means, by collating with a predetermined function removal rule, which removes a function that becomes unnecessary from said set of object-oriented functions by which members are realized, for generating from the specification information and the optimization instruction entered by said system, operator, program information excluding the unnecessary function; and a code generation means for generating a code according to said program information obtained by said function removing means;

wherein said optimized information input means is operable after said system operator has input said object oriented specification and before generation of said code, and includes a graphic display which presents to said system operator a selection from among use and not-to-use options for said dynamic generation function.

6. The software generation system according to claim 5, further comprising:

an analysis result display means for displaying a status of use of an object-oriented function by which a member is realized from the specification information.

7. The software generation system according to claim 6, wherein said selection means comprises display means for displaying use and not-to-use indicators, for individual ones of said respective object-oriented functions, which indicators can be selected by said system operator via an input interface.

8. The software generation system according to claim 5, wherein said selection means comprises display means for displaying use and not-to-use indicators, for individual ones of said respective object-oriented functions, which indicators can be selected by said system operator via an input interface.

9. A method for automatically generating software, using a software generation system having a processing system that includes a system operator interface, a specification analysis unit which analyzes an object oriented specification input by the system operator for deriving specification information, and a code generating unit for generating a code according to said specification information, said method comprising:

said system operator entering an object oriented specification into said processing system via said interface;

after entry of said object oriented specification, said processing system displaying to said system operator a function item selection screen, which offers to said system operator an option to select from use and not-to-use instructions for respective object oriented functions contained in a set of object oriented functions;

for each of said respective object oriented functions, said system operator selecting one of said use and not-to-use instructions;

said processing system checking said specific information derived by said specification analysis unit and said use and not-to-use instructions selected by said system operator, by collating with a predetermined function removal rule, which removes a function that becomes unnecessary from said set of object-oriented functions by which members are realized, for generating from said specification information and said instructions, program information excluding unnecessary functions; and said code generating unit generating a code according to said program information excluding unnecessary functions.

* * * * *